Patented July 3, 1934

1,965,535

UNITED STATES PATENT OFFICE 1,965,535

STABLE CALCIUM GLUCONATE SOLUTION AND PROCESS OF MAKING SAME

Richard Pasternack, Brooklyn, N. Y., and William Ralph Giles, Narberth, Pa., assignors to Charles Pfizer & Company, Brooklyn, N. Y., a corporation of New Jersey No Drawing. Application March 1, 1933, Serial No. 659,176

10 Claims. (Cl. 167—68)

This invention relates to a calcium gluconate composition useful in the preparation of concentrated solutions of relatively great stability for therapeutic uses, and process for its preparation; and is a continuation in part of our copending application S. N. 551,562, filed July 17, 1931.

In the original application we have disclosed that calcium saccharate, which is itself almost insoluble in water, will dissolve in calcium gluconate solutions and will then stabilize such solutions. The calcium saccharate preferred for the purpose of this invention is the normal calcium salt of d-saccharic acid, containing four mol. of water per mol. of the salt, obtained for instance by precipitation of a neutral alkali saccharate solution with calcium chloride. We have further found that a variety of calcium saccharate may be prepared which is partially or wholly insoluble in calcium gluconate solution. For example, if calcium saccharate is dissolved in concentrated calcium chloride solution, reprecipitated with alcohol, and left in contact with the mother liquor until crystalline, it will not again dissolve either in calcium chloride solution nor in solutions of calcium gluconate. A convenient test of the suitability of a given sample for stabilizing a calcium solution is to determine its solubility in a boiling 10% solution of calcium gluconate. Unless at least 1.5 g. of the saccharate dissolves in 100 cc. of this test solution the sample should be rejected.

For the preparation of calcium solutions for therapeutic purposes, we prefer to use calcium d-gluconate, stabilizing the solution by means of a minor proportion of calcium saccharate. An especial advantage of calcium saccharate for this purpose is that it contains a higher percentage by weight of calcium than does calcium gluconate.

Solutions made by our process are reasonably stable in storage, and will not precipitate immediately upon seeding, but they must be protected from infection, since fermentation readily occurs in the presence of microorganisms. The stabilized solutions are prepared by dissolving the desired proportions of the gluconate and saccharate in boiling water.

The solubility of calcium-saccharate in solutions of calcium gluconate was found to be less than 19 parts of calcium saccharate to 100 parts of calcium gluconate. A 30% by weight solution of calcium gluconate can be prepared, using calcium saccharate. This concentration is beyond the saturation point of calcium gluconate alone in boiling water. Even more highly concentrated solutions of somewhat limited stability can be prepared from calcium gluconate and calcium saccharate in the indicated proportions. Once in solution, the mixture of gluconate and saccharate can be isolated as an amorphous dry powder, readily soluble in cold water, by any suitable means which causes rapid evaporation of the water, or by dehydration with organic solvents. For a solution containing 10% calcium gluconate, to be used in ampoules, it is sufficient to use as little as one part of calcium saccharate to 50 parts of calcium gluconate. A solution of 20% concentration requires one part of calcium saccharate to 10 parts of calcium gluconate. For solutions of higher concentration, calcium saccharate should be used up to the limit of solubility of approximately 19 parts to 100 parts of calcium gluconate. A solution containing 30% by weight of calcium gluconate and calcium saccharate up to the limit of its solubility in this solution, when sealed in ampoules is stable for several weeks, but eventually deposits a small amount of calcium gluconate. A similar solution containing 40% calcium gluconate is only stable for about 24 hours.

Normal calcium l-saccharate, four water salt, was found to be a much less effective stabilizer for calcium gluconate than the corresponding d-salt. An equally proportioned mixture of d- and l-saccharate however appears to be an even better stabilizer than the d-salt alone. Eight parts of this mixture are approximately equal in stabilizing effect to 10 parts of the d-saccharate alone.

Suitable methods for preparing the dry composition for making concentrated solutions in cold water are spray-drying and rapid vacuum drying (as for instance in a vacuum drum dryer or in a vacuum shelf dryer in thin layers). Experiments so far conducted have shown that the drying period should not much exceed one hour, and that 4 hours may produce a small amount of crystalline material which is only completely soluble in hot water. A properly dried preparation will dissolve in less than 3 parts of cold water. The amorphous mixture of gluconate and saccharate can also be obtained from an aqueous solution by precipitation with alcohol, acetone or similar solvents. These precipitated products when properly prepared are also soluble in less than 3 parts of cold water.

Example I 100 g. calcium gluconate and 2 g. calcium saccharate are dissolved in approximately 800 cc boiling water. The solution is then made up to a weight of 1 kg. In order to preserve this solution, it can be put into sealed ampoules and sterilized in the known manner, or a preservative is added to this solution, as for instance, 1 g. phenol, and it is then put up in sealed ampoules. In this case, no sterilization is necessary. A third method of preserving the ampoules is to filter the boiling solution through a Berkefeld filter and seal under aseptic conditions.

*Example II*

100 parts calcium gluconate and .5 to 19 parts of calcium saccharate are dissolved in 500 parts water at 90–100° C. and sprayed by means of an atomizer into a dry, preheated atmosphere, such as air or inert gas. Evaporation of the water is so rapid that comparatively high temperatures may be used without injury to the product. Any standard type of spray drier may be used which is capable of delivering the powder in a dry condition.

The resulting dry powder is amorphous. It dissolves in 3 parts of cold water. The stability of a solution of the dry product depends upon the concentration and the ratio of calcium saccharate to calcium gluconate, and it can be preserved as stated in Example I.

*Example III*

200 g. calcium gluconate and 20 g. calcium saccharate are dissolved in about 750 cc. boiling water. The solution is then made up to a weight of 1000 g. This solution is filtered clear by known means, and may be preserved in any of the ways indicated in Example I.

*Example IV*

150 g. calcium gluconate and 28 g. calcium d-saccharate are dissolved in 500 cc boiling water. The solution is cooled and filtered, then evaporated to dryness in a flask heated externally by a boiling water bath, under the vacuum of a water jet pump. The material dries to a white porous mass. It may then be powdered to any fineness desired. It readily dissolves in three parts cold water, giving a clear solution. A 20% solution of this mixture, if protected from infection, is stable for many weeks.

*Example V*

100 parts calcium d-gluconate, 4 parts calcium d-saccharate and 4 parts calcium l-saccharate are dissolved in 800 parts water at 90–100° C. The solution is spray-dried, giving an morphous, white powder. A 20% by weight solution of this product protected from infection is still entirely clear after two months storage.

What we claim is:

1. Process of preparing a stable concentrated solution of calcium gluconate which comprises dissolving calcium gluconate with a minor proportion of calcium saccharate in water at an elevated temperature.

2. Process of preparing a dry amorphous calcium composition comprising dissolving calcium gluconate with one half to nineteen per cent of its weight of calcium saccharate in water at a boiling temperature and rapidly dehydrating the mixture.

3. Process of preparing a dry amorphous calcium composition comprising dissolving calcium gluconate and a minor proportion of a mixture of equal parts by weight of calcium d- and l-saccharate in water at a boiling temperature and rapidly dehydrating the mixture.

4. As a new composition of matter, a stabilized concentrated solution of calcium gluconate and calcium saccharate.

5. As a new composition of matter, a dry amorphous mixture of calcium gluconate with one half to nineteen per cent of its weight of calcium saccharate.

6. As a new composition of matter, an amorphous spray-dried product comprising calcium gluconate and a minor proportion of calcium saccharate.

7. As a new composition of matter, a dry amorphous mixture of calcium gluconate and a minor proportion of a mixture of equal parts by weight of calcium d- and l-saccharate.

8. As a new composition of matter, a dry amorphous product comprising calcium gluconate and a minor proportion of calcium saccharate made soluble by rapid drying in the presence of the gluconate.

9. A stabilizing agent for calcium gluconate solutions comprising the dry amorphous residue from rapid dehydration of an aqueous solution of calcium gluconate and about 19% of its weight of calcium saccharate.

10. As a new composition of matter, a dry amorphous mixture of calcium gluconate with ½–19% of its weight of calcium saccharate, soluble in less than 3 parts of water, and forming concentrated solutions which are more stable than therapeutically equivalent solutions of calcium gluconate.

RICHARD PASTERNACK.
WILLIAM RALPH GILES.